United States Patent
Sakai

(10) Patent No.: US 11,405,525 B2
(45) Date of Patent: Aug. 2, 2022

(54) IMAGE PROCESSING APPARATUS, CONTROL METHOD, AND PRODUCT CAPABLE OF IMPROVING COMPRESSION EFFICIENCY BY CONVERTING CLOSE COLOR TO BACKGROUND COLOR IN A LOW LIGHT READING MODE

(71) Applicant: CANON KABUSHIKI KAISHA, Tokyo (JP)

(72) Inventor: Hiroyuki Sakai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/470,088

(22) Filed: Sep. 9, 2021

(65) Prior Publication Data
US 2022/0109777 A1    Apr. 7, 2022

(30) Foreign Application Priority Data
Oct. 6, 2020 (JP) .............................. JP2020-169184

(51) Int. Cl.
*H04N 1/407* (2006.01)
*H04N 1/00* (2006.01)
*H04N 1/60* (2006.01)
*H04N 1/64* (2006.01)

(52) U.S. Cl.
CPC ....... *H04N 1/4074* (2013.01); *H04N 1/00005* (2013.01); *H04N 1/00013* (2013.01); *H04N 1/00037* (2013.01); *H04N 1/603* (2013.01); *H04N 1/644* (2013.01)

(58) Field of Classification Search
None
See application file for complete search history.

(56) References Cited

U.S. PATENT DOCUMENTS

| 7,626,725 | B2 | 12/2009 | Fukusaka |
| 8,184,337 | B2 | 5/2012 | Sakai |
| 8,718,359 | B2 | 5/2014 | Sakai et al. |
| 9,083,841 | B2 * | 7/2015 | Kurotsu ............. H04N 1/02815 |
| 9,189,681 | B2 | 11/2015 | Kunieda et al. |
| 9,214,027 | B2 | 12/2015 | Sumi et al. |
| 9,275,270 | B2 | 3/2016 | Suwa et al. |
| 9,727,951 | B2 | 8/2017 | Sakai et al. |

(Continued)

FOREIGN PATENT DOCUMENTS

JP   2006-295307 A    10/2006
JP   2019193004 A *  10/2019

*Primary Examiner* — Scott A Rogers
(74) *Attorney, Agent, or Firm* — Venable LLP

(57) ABSTRACT

A mechanism capable of improving the compression efficiency of image data generated by performing the dark reading is provided. An image processing apparatus comprising a reading unit configured to read a document and generate image data, a reading mode setting unit configured to set a reading mode of the reading unit to a first reading mode or a second reading mode, in which the document is read with the amount of light less than that in the first scanning mode, a background color determining unit configured to determine a background color in the image data generated by the reading unit, and a conversion image generating unit configured to generate image data, in which a color close to the background color in the image data is converted into the background color, in a case that the second reading mode is set.

11 Claims, 16 Drawing Sheets

(56) References Cited

U.S. PATENT DOCUMENTS

| | | |
|---|---|---|
| 9,787,874 B2 | 10/2017 | Takesue et al. |
| 10,013,395 B2 | 7/2018 | Kajiwara et al. |
| 2006/0227392 A1 | 10/2006 | Fukusaka |
| 2011/0285871 A1 | 11/2011 | Sakai |
| 2021/0211555 A1 | 7/2021 | Omagari et al. |
| 2021/0306496 A1* | 9/2021 | Sunako .............. H04N 1/40056 |

* cited by examiner

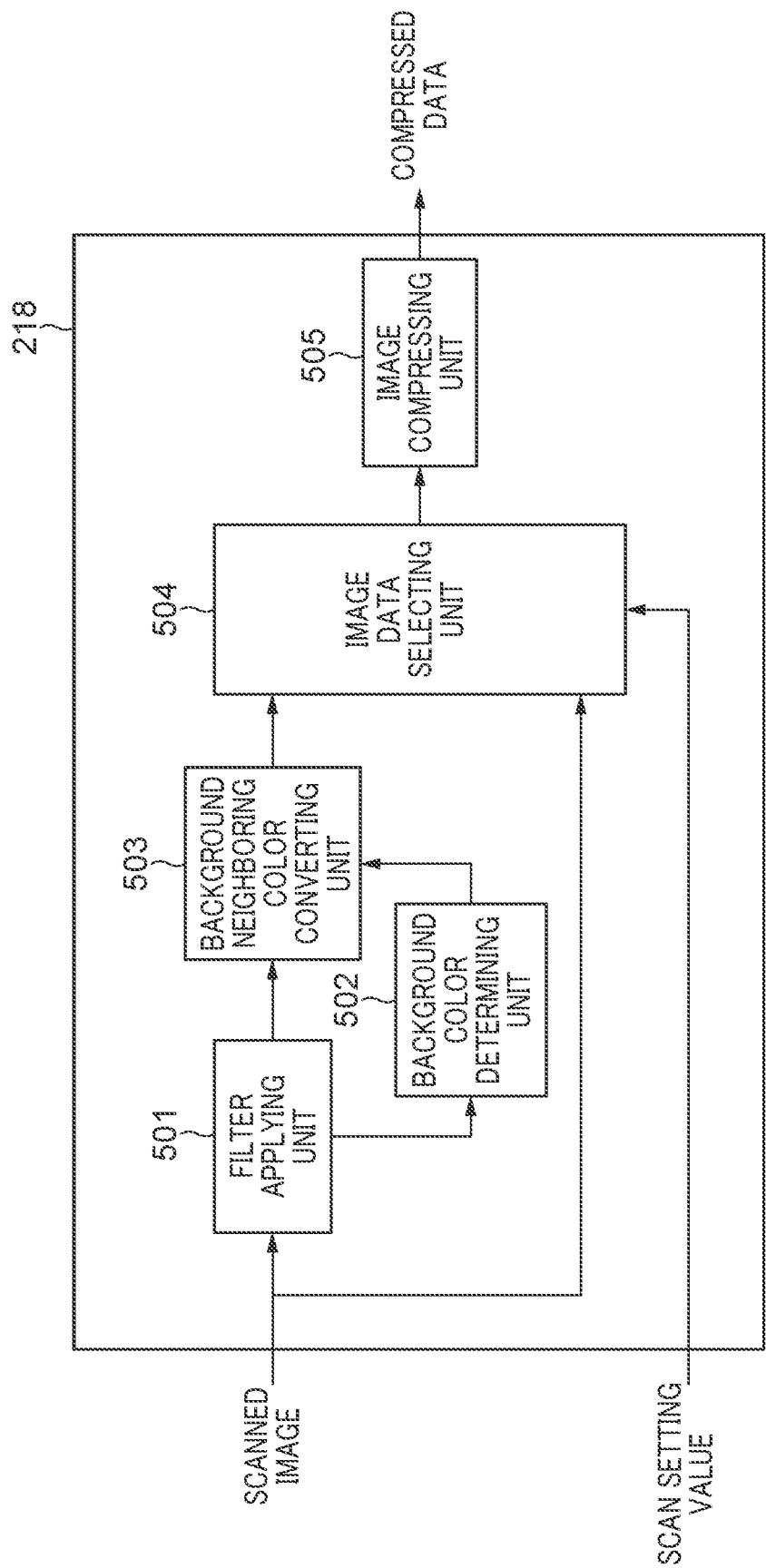

*FIG. 8A*
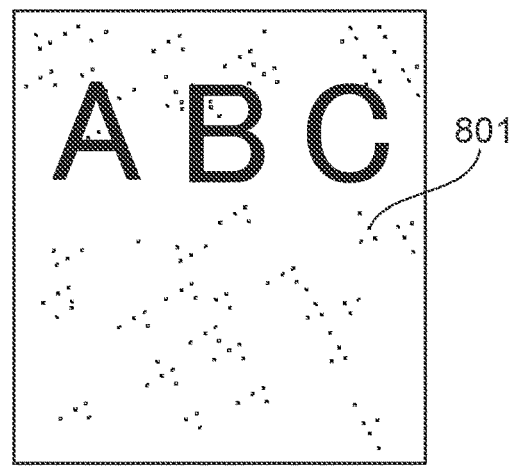
*FIG. 8B*
| BACKGROUND COLOR | PIXEL OF INTEREST |
|---|---|
| (190, 190, 190) | (189, 188, 190) |
*FIG. 8C*
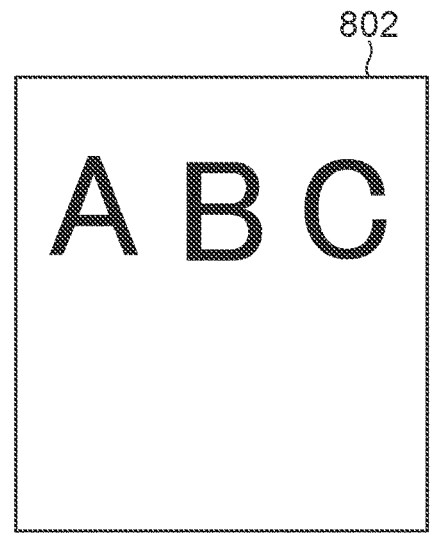

IMAGE PROCESSING APPARATUS, CONTROL METHOD, AND PRODUCT CAPABLE OF IMPROVING COMPRESSION EFFICIENCY BY CONVERTING CLOSE COLOR TO BACKGROUND COLOR IN A LOW LIGHT READING MODE

BACKGROUND OF THE INVENTION

Field of the Invention

The present invention relates to an image processing apparatus capable of improving compression efficiency of electronic documents, a control method for the image processing apparatus, and a storage medium.

Description of the Related Art

An image processing apparatus that optically scans a paper document and generates an electronic document is known. In a case of digitizing a paper document having a background of an achromatic color whose density is low density, for example, a paper document having a white background, the image processing apparatus performs a background removal processing for converting a color of a region having a certain brightness or higher into white. By performing the background removal processing, a good-looking electronic document with a clear contrast between text and the background in the paper document is generated. Further, since a color of a background region that occupies most of the region in the electronic document is unified to white by performing the background removal processing, when data of the above electronic document is compressed, the compression efficiency is improved.

By the way, due to the revision of the legal system accompanying the progress of electronic document technology, tax-related forms, etc., which were previously accepted as originals only for paper documents, can now be accepted as originals if they satisfy prescribed conditions. The condition that the electronic document can be accepted as the original, is that, for example, the visibility of information such as correction marks, etc. is maintained. However, in a case that the above-mentioned background removal processing is performed in the image processing apparatus, there is a possibility that the above condition can not be satisfied. For example, the correction marks caused by a white correction fluid or the like are often whiter than a paper background portion of the paper document. When the background removal processing is executed, the correction marks are converted into white as well as the paper background portion, a gradation difference between the paper background portion and the correction marks disappears, the correction marks disappear on the electronic document, and then the above-mentioned condition can not be satisfied. On the other hand, a technique has been proposed, in which the amount of light emitted when reading a paper document is suppressed and the paper document is read darkly (hereinafter, such a reading method is referred to as "dark reading") so as to maintain the gradation difference between the paper background portion and the correction marks (for example, see Japanese Laid-Open Patent Publication (kokai) No. 2006-295307).

However, in a case of generating an electronic document by means of the above-mentioned dark reading, in order to maintain the gradation difference between the paper background portion and the correction marks, in a paper background region that occupies most of the region of the electronic document, unification of color by means of the background removal processing is not performed. For this reason, conventionally, when data of the electronic document generated by performing the dark reading is compressed, the compression efficiency is lowered.

SUMMARY OF THE INVENTION

The present invention provides a mechanism capable of improving the compression efficiency of image data generated by performing the dark reading.

Accordingly, the present invention provides an image processing apparatus comprising a reading unit configured to read a document and generate image data, a reading mode setting unit configured to set a reading mode of the reading unit to a first reading mode or a second reading mode, in which the document is read with the amount of light less than that in the first scanning mode, a background color determining unit configured to determine a background color in the image data generated by the reading unit, and a conversion image generating unit configured to generate image data, in which a color close to the background color in the image data is converted into the background color, in a case that the second reading mode is set.

According to the present invention, it is possible to improve the compression efficiency of the electronic document (the image data) generated by performing the dark reading.

Further features of the present invention will become apparent from the following description of exemplary embodiments with reference to the attached drawings.

BRIEF DESCRIPTION OF THE DRAWINGS

FIG. 5 is a block diagram that schematically shows one configuration of a data processing unit of FIG. 2.

FIGS. 8A, 8B and 8C are figures for explaining details of the color converting processing of FIG. 7.

DESCRIPTION OF THE EMBODIMENTS

The present invention will now be described in detail below with reference to the accompanying drawings showing embodiments thereof.

Figure 1:
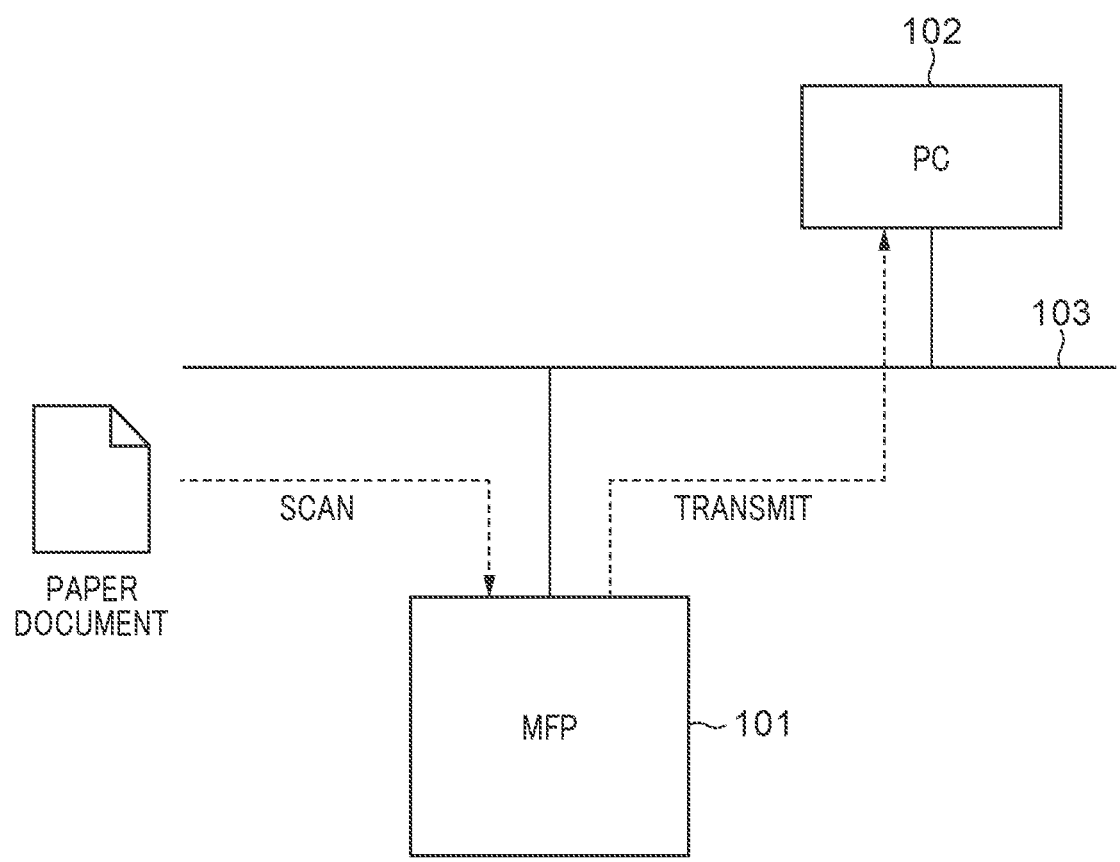
FIG. 1 is a schematic diagram that shows a system configuration of an MFP as an image processing apparatus according to an embodiment of the present invention.

FIG. 1 is a schematic diagram that shows a system configuration of an MFP (multifunction peripheral) 101 as an image processing apparatus according to an embodiment of the present invention. As shown in FIG. 1, the MFP 101 is connected to a PC (personal computer) 102 via a network 103. A user can operate an operating unit 203 of FIG. 2, which will be described later and is included in the MFP 101, to perform settings to be used when the MFP 101 reads a document. As the said settings, the user sets, for example, a resolution, a compression rate, a data format (for example, JPEG (Joint Photographic Experts Group), TIFF (Tagged Image File Format), PDF (Portable Document Format), minority color compression, minority color compression (with OCR (Optical Character Recognition) results), an e-document law mode), etc. Details of the e-document law mode will be described later. The MFP 101 reads a document set on a document table (not shown) based on various settings set by the user, generates a scanned image of the document, and transmits the scanned image generated to a designated destination, for example, the PC 102.

Figure 2:
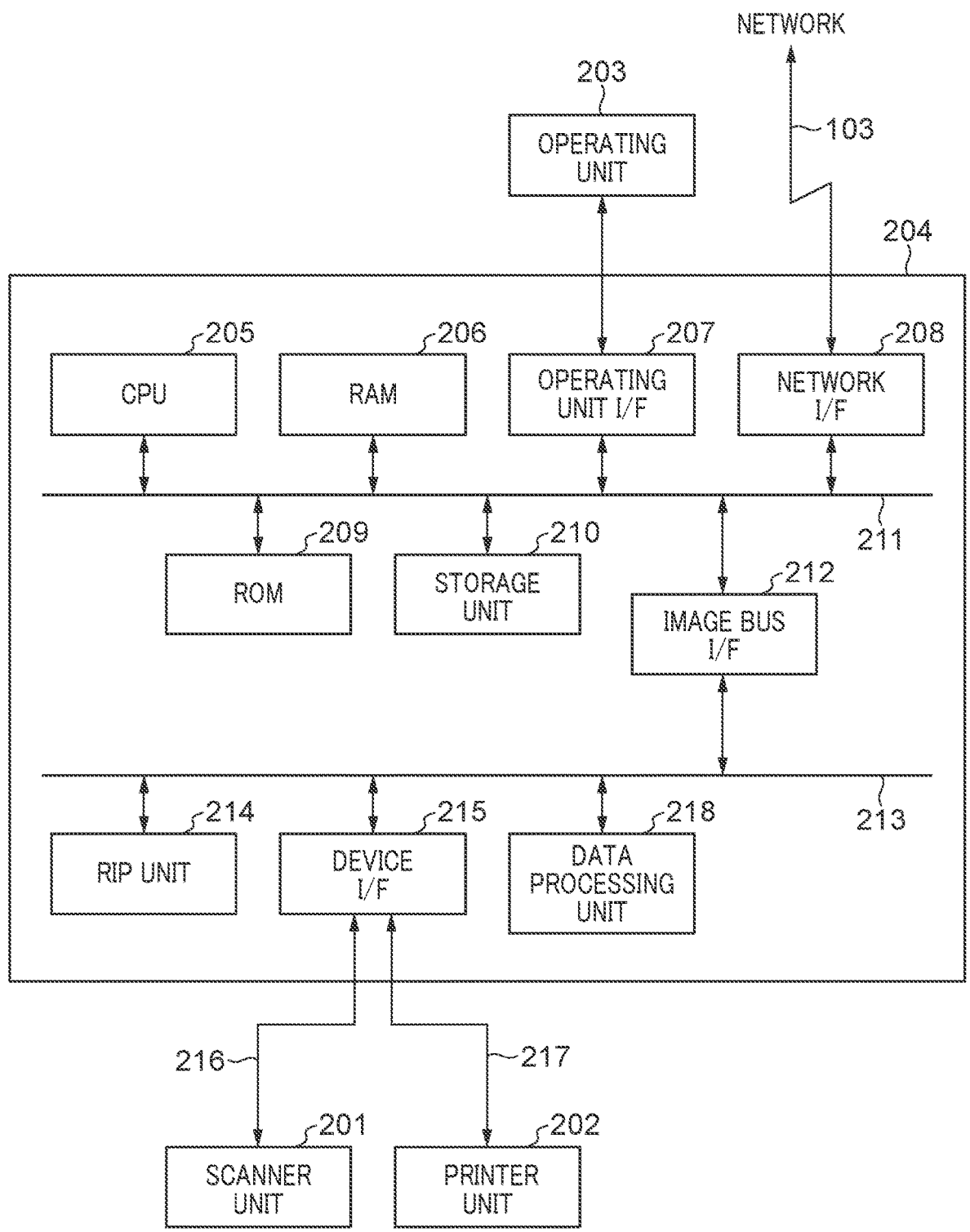
FIG. 2 is a block diagram that schematically shows the configuration of the MFP of FIG. 1.

FIG. 2 is a block diagram that schematically shows the configuration of the MFP 101 of FIG. 1. As shown in FIG. 2, the MFP 101 has a scanner unit 201, a printer unit 202, the operating unit 203, and a control unit 204.

The scanner unit 201 is an image input device, and for example, reads the document set on the document table, and generates the scanned image of the said document. Further, the scanner unit 201, which functions as a reading mode setting unit, sets a reading mode to an ordinary reading mode (a first reading mode) or a dark reading mode (a second reading mode) based on setting values that are designated by the user. The dark reading mode is a reading mode, in which the amount of light when reading a document is less than that in the ordinary reading mode. The dark reading mode is set when it is necessary to maintain a gradation difference between background of a document and correction marks, for example, when generating a scanned image corresponding to Law on Book and Record Keeping through Electronic Methods (e-document law). The printer unit 202 is an image output device, and prints, for example, an image generated by the scanner unit. The operating unit 203 is a user interface in the MFP 101.

The control unit 204 is connected to the scanner unit 201, the printer unit 202, and the operating unit 203. Further, the control unit 204 performs input/output of image information and device information by connecting to the network 103. The control unit 204 has a CPU (Central Processing Unit) 205, a RAM (Random Access Memory) 206, an operating unit I/F (interface) 207, a network I/F 208, a ROM (Read Only Memory) 209, and a storage unit 210. Further, the control unit 204 has an image bus I/F 212, a RIP (Raster Image Processor) unit 214, a device I/F 215, and a data processing unit 218 that functions as a conversion image generating unit.

The CPU 205 is a processor that controls the entire system. The RAM 206 is a system working memory used when the CPU 205 works, and is an image memory for temporarily storing images. The operating unit I/F 207 is an interface unit between the control unit 204 and the operating unit 203. For example, the operating unit I/F 207 outputs images to be displayed on the operating unit 203 to the operating unit 203. Further, the operating unit I/F 207 transmits information, which is inputted into the operating unit 203 by the user, to the CPU 205. The network I/F 208 connects the MFP 101 to the network 103 and performs input/output of packet format information. The ROM 209 is a boot ROM and stores boot programs of the system, etc. The storage unit 210 is a hard disk drive and stores system control software, images, and the like. The CPU 205, the RAM 206, the operating unit I/F 207, the network I/F 208, the ROM 209, and the storage unit 210 are connected to each other via a system bus 211. The image bus I/F 212 is a bus bridge that connects the system bus 211 and an image bus 213 and converts data structure. The image bus 213 enables high-speed transfer of images, and is configured by, for example, a PCI (Peripheral Component Interconnect) bus or IEEE 1394.

The RIP unit 214, the device I/F 215, and the data processing unit 218 are connected to the image bus 213. The RIP unit 214 analyzes PDL (Page Description Language) codes of print data received from an external device or the like by the MFP 101, and executes a rendering processing that expands the said print data into a bitmap image having a designated resolution. The device I/F 215 is connected to the scanner unit 201 via a signal line 216, and is connected to the printer unit 202 via a signal line 217. The data processing unit 218 executes an image processing of the scanned image obtained from the scanner unit 201 and a generation processing of a printed image to be output to the printer unit 202, and also performs a processing such as the minority color compression and the OCR. As a result, compressed data, which will be described later, is generated. The compressed data generated is transmitted to a destination designated by the user, for example, the PC 102, via the network I/F 208 and the network 103. The data processing unit 218 can also decompress the compressed data received via the network I/F 208 and the network 103. The expanded (decompressed) image is transferred to the printer unit 202 via the device I/F 215, and the printer unit 202 prints the image obtained via the device I/F 215.

Figure 3A:
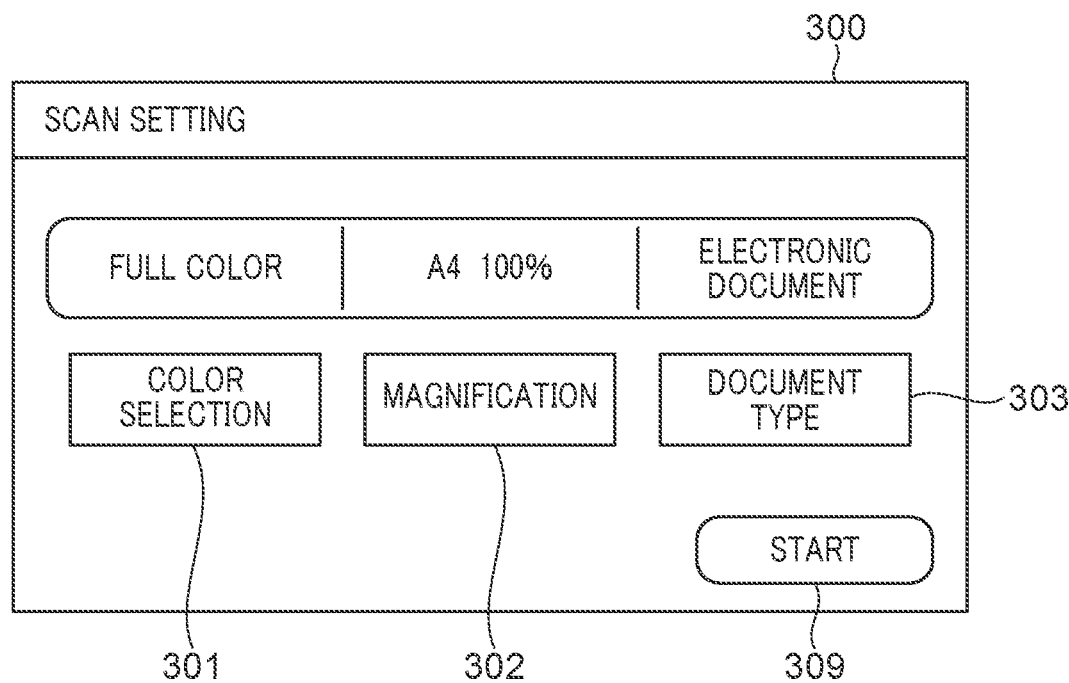
FIGS. 3A and 3B are diagrams that show an example of a setting screen displayed on an operating unit of FIG. 2.
Figure 3B:
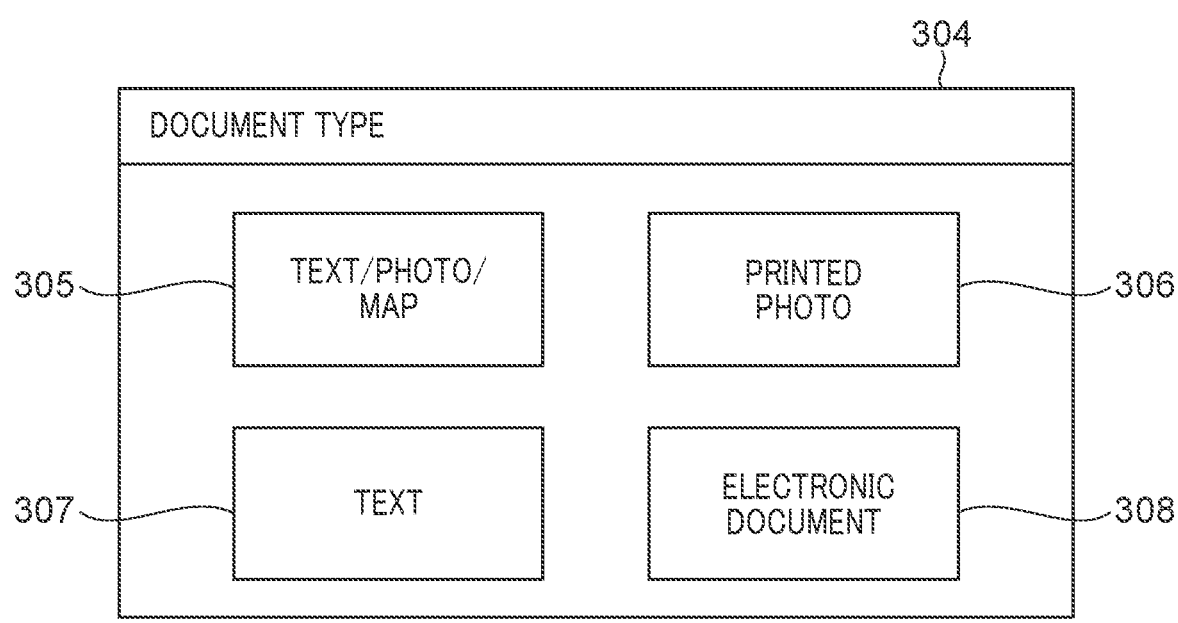

FIGS. 3A and 3B are diagrams that show an example of a setting screen displayed on the operating unit 203 of FIG. 2. FIG. 3A is a diagram that show an example of a scan setting screen 300 displayed on the operating unit 203.

The scan setting screen 300 is a screen for the user to instruct the MFP 101 to read a document. The scan setting screen 300 includes a color selection button 301, a magnification button 302, a document type button 303, and a start button 309. The color selection button 301 is a button for performing a color setting when storing or copying a scanned image of a document read by the scanner unit 201. For example, the user operates the color selection button 301 to set "black and white" or "full color". The magnification button 302 is a button for performing a magnification setting of the scanned image of the document read by the scanner unit 201. The document type button 303 is a button for performing a document type setting of a document to be read. When the user selects the document type button 303, the screen of the operating unit 203 changes to a document type setting screen 304 of FIG. 3B.

The document type setting screen 304 includes a plurality of buttons corresponding to typical document types, specifically, a text/photo/map button 305, a printed photo button 306, a text button 307, and an electronic document button 308. The text/photo/map button 305 is a button that is selected when the document to be read is a document composed of various contents such as photos and texts. The printed photo button 306 is a button that is selected when the document to be read is a document mainly composed of photos. The text button 307 is a button that is selected when the document to be read is a document mainly composed of text. The electronic document button 308 is a button that is selected when instructing the generation of the scanned image corresponding to the Law on Book and Record Keeping through Electronic Methods (the e-document law). In the MFP 101, with respect to the scanned image of the document read by the scanner unit 201, an image processing corresponding to a document type set by the user on the document type setting screen 304 is executed.

Further, in the MFP 101, a reading mode flag is set based on the document type set by the user on the document type setting screen 304. For example, in a case that the user selects the electronic document button 308 on the document type setting screen 304, the reading mode flag is set to "1". The scanner unit 201 reads the document in the dark reading mode, which is set according to this reading mode flag. On the other hand, in a case that the user selects a button other than the electronic document button 308 on the document type setting screen 304, the reading mode flag is set to "0". The scanner unit 201 reads the document in the ordinary reading mode, which is set according to this reading mode flag. In this way, in the MFP 101, the reading mode of the scanner unit 201 is controlled based on the reading mode flag. The reading mode flag is transferred to the data processing unit 218 via the operating unit I/F 207 and the CPU 205.

When the user selects any one of buttons on the document type setting screen 304, the screen of the operating unit 203 changes to the scan setting screen 300. When the user performs various settings and selects the start button 309 on the scan setting screen 300, the operating unit I/F 207 notifies the CPU 205 of setting values that are set on the scan setting screen 300 (hereinafter, referred to as "scan setting values"). The CPU 205 starts a scanning control processing of FIG. 4 based on the scan setting values that are received from the operating unit I/F 207.

Figure 4:
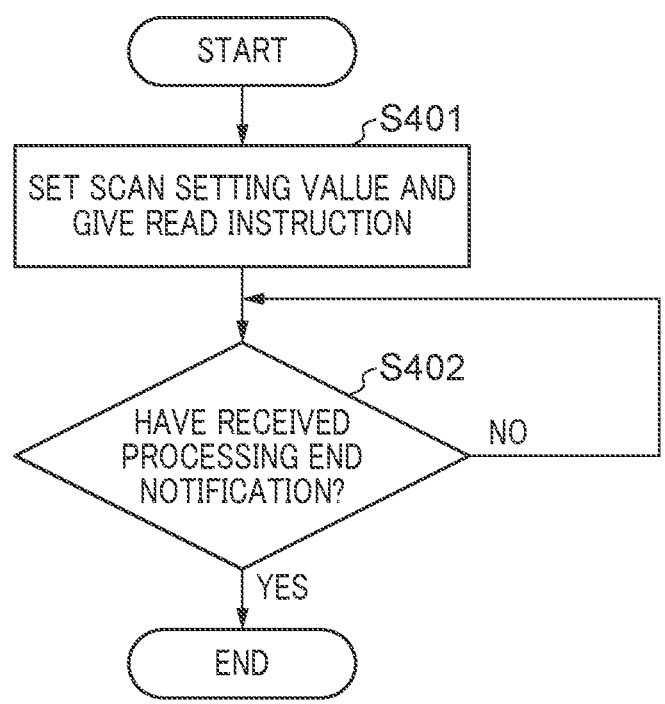
FIG. 4 is a flowchart that shows procedures of a scanning control processing performed by the MFP of FIG. 1.

FIG. 4 is a flowchart that shows procedures of the scanning control processing performed by the MFP 101 of FIG. 1. The processing of FIG. 4 is realized by the CPU 205 executing a program stored in the ROM 209 or the storage unit 210.

As shown in FIG. 4, at first, the CPU 205 sets the scan setting values, which are received from the operating unit I/F 207, in the data processing unit 218, and instructs the scanner unit 201 to read a document (a step S401). The scanner unit 201, which functions as a reading unit, reads the document (paper document) according to the instruction received from the CPU 205, generates a scanned image of the above document, and transmits the scanned image to the data processing unit 218. The data processing unit 218 executes a color converting processing of FIG. 7, which will be described later, based on the scanned image received to generate a conversion image, and compresses the said conversion image in a compression format such as JPEG format to generate compressed data. Further, the data processing unit 218 transmits a processing end notification indicating that the processing performed by the data processing unit 218 has been completed to the CPU 205.

The CPU 205 waits until it receives the processing end notification. When receiving the processing end notification from the data processing unit 218 (YES in a step S402), the CPU 205 ends this processing.

FIG. 5 is a block diagram that schematically shows one configuration of the data processing unit 218 of FIG. 2. As shown in FIG. 5, the data processing unit 218 has a filter applying unit 501 that functions as an image processing unit, a background color determining unit 502, a background neighboring color converting unit 503, an image data selecting unit 504, and an image compressing unit 505.

Figure 6A:
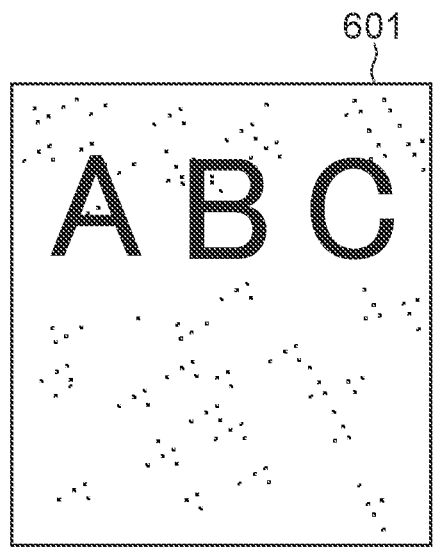
FIG. 6A is a figure that shows an example of a filter-applied image generated by the data processing unit of FIG. 2.

The filter applying unit 501 uses an edge preservation smoothing filter such as a median filter or a bilateral filter to perform a filter processing for smoothing a small edge while holding a large edge with respect to the scanned image obtained from the scanner unit 201. Hereinafter, the scanned image will be described as an RGB image including an R (Red) component, a G (Green) component, and a B (Blue) component. By the above filter processing, the variation of each value of the R component, the G component, and the B component (hereinafter, referred to as "RGB value") of a plurality of pixels, which constitutes the scanned image, is suppressed, and it becomes possible that the determination of a background color described later is easily performed. As a result of performing the above filter processing, a filter-applied image 601 (image-processed image data) of FIG. 6A is generated, and the filter applying unit 501 outputs the filter-applied image 601 to the background color determining unit 502.

Figure 6B:
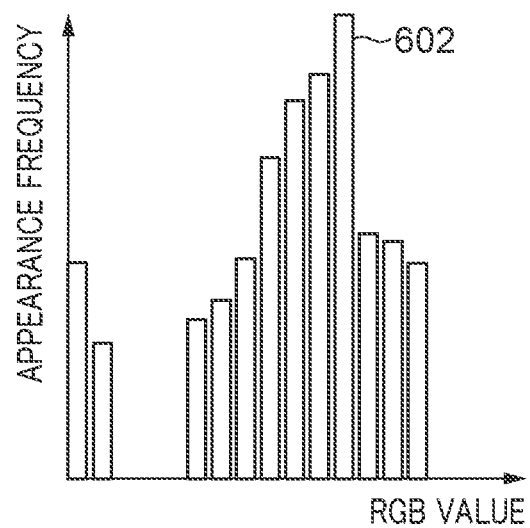
FIG. 6B is a figure that shows an example of a histogram of the filter-applied image generated by the data processing unit of FIG. 2.

The background color determining unit 502 determines the background color based on the filter-applied image 601 obtained from the filter applying unit 501. Here, even in the filter-applied image 601 that is obtained by performing the above filter processing, sometimes the color of the background region is not uniformized. When an RGB histogram of such a filter-applied image 601 is calculated, it can be shown as shown in FIG. 6B. Moreover, originally, it is shown as a four-dimensional histogram, in which the horizontal axis is the R component, the G component, and the B component and the vertical axis is an appearance frequency, but in a histogram of FIG. 6B, for ease of explanation, the horizontal axis is a total value of RGB values and the vertical axis is the appearance frequency. In the present embodiment, the background color determining unit 502 determines a color corresponding to a total value 602 of the RGB values that has the highest appearance frequency in the histogram of FIG. 6B as the background color. Moreover, the method of determining the background color is not limited to the above-mentioned method. For example, a histogram of values obtained by blending the values of the R component, the G component, and the B component in a predetermined ratio may be calculated, and a color having the highest appearance frequency may be determined as the background color. The background color determining unit 502 generates background color information that indicates the determined background color, and outputs the generated background color information to the background neighboring color converting unit 503. For example, the background color information is indicated by the RGB values (190, 190, 190).

The background neighboring color converting unit 503 converts a color close to a color indicated by the background color information in the filter-applied image 601 (hereinafter, the color indicated by the background color information in the filter-applied image 601 is simply referred to as "background color") into the background color, so as to generate a background neighboring color conversion image 802 of FIG. 8C, which will be described later. Further, the generation of the background neighboring color conversion image 802 will be described later with reference to FIG. 7.

The image data selecting unit 504 selects an output image based on the reading mode flag. In the case that the reading mode flag is "1", that is, in the case that the user has selected the electronic document button 308 on the document type setting screen 304, the image data selecting unit 504 outputs the background neighboring color conversion image 802 to the image compressing unit 505. In the case that the reading mode flag is "0", that is, in the case that the user has selected the button other than the electronic document button 308 on the document type setting screen 304, the image data selecting unit 504 outputs the scanned image received from the scanner unit 201 as it is to the image compressing unit 505.

The image compressing unit 505 compresses the image obtained from the image data selecting unit 504 in the compression format such as JPEG format to generate the compressed data. The said compressed data is transmitted to the destination included in the scan setting values, for example, the PC 102. When the transmission of the compressed data is completed, the image compressing unit 505 transmits the processing end notification to the CPU 205.

Figure 7:
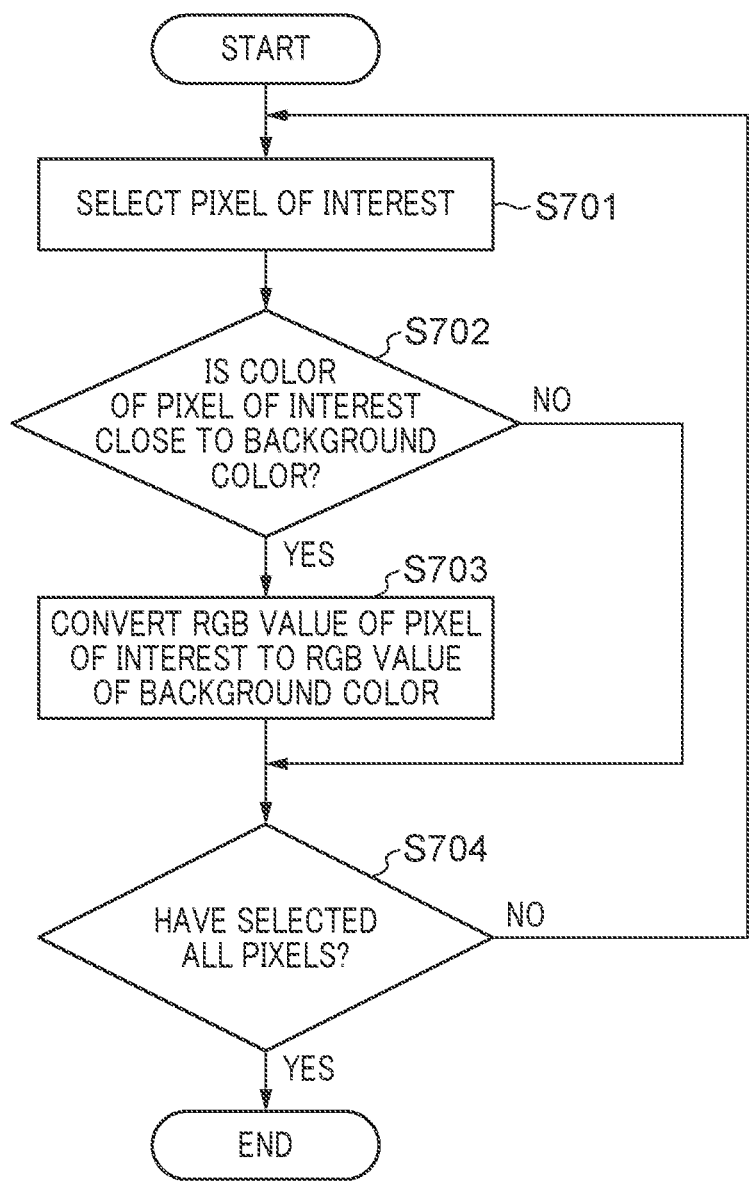
FIG. 7 is a flowchart that shows procedures of a color converting processing performed by the data processing unit of FIG. 2.

FIG. 7 is a flowchart that shows procedures of the color converting processing performed by the data processing unit 218 of FIG. 2. The processing of FIG. 7 is executed when the data processing unit 218 obtained the reading mode flag set to "1" from the CPU 205. Further, as described above, when the reading mode flag is set to "1", the scanner unit 201 reads the document in the dark reading mode.

As shown in FIG. 7, the data processing unit 218 selects one pixel from a plurality of pixels constituting the filter-applied image 601, for example, a pixel 801 of FIG. 8A as a pixel of interest (a step S701). A selection order of the pixel of interest in the filter-applied image 601 is, for example, a raster scan order of the entire filter-applied image 601. Moreover, the selection order of the pixel of interest in the filter-applied image 601 is not limited to the raster scan order of the entire filter-applied image 601, and may be other orders.

Next, the data processing unit 218 judges whether or not a color corresponding to the RGB values of the pixel of interest is a color close to the background color determined by the background color determining unit 502 (a step S702). Specifically, the data processing unit 218 calculates a difference between the RGB value of the pixel of interest and the RGB value of the background color with respect to the R component, the G component, and the B component. For example, as shown in FIG. 8B, in the case that the RGB values of the pixel of interest are (189, 188, 190) and the RGB values of the background color are (190, 190, 190), the differences of the R component, the G component, and the B component are (1, 2, 0). In this way, in the case that all the differences of the R component, the G component, and the B component are equal to or less than a preset predetermined value, the data processing unit 218 judges that the color corresponding to the RGB values of the pixel of interest is the color close to the background color. Further, the above predetermined value is a value less than a color difference between the paper background portion of the paper document and the correction mark, and is a value determined based on class "A" tolerance of color difference, for example, 3. That is, in the present embodiment, a color corresponding to RGB values that a color difference from the background color is less than the color difference between the paper background portion of the paper document and the correction mark, is judged as the color close to the background color. On the other hand, in the case that any one of the differences of the R component, the G component, and the B component is larger than the above predetermined value, the data processing unit 218 judges that the color corresponding to the RGB values of the pixel of interest is not the color close to the background color. Moreover, the judging method in the step S702 is not limited to the above-mentioned method, and for example, difference values of a Cb component and a Cr component in YCbCr color space consisting of the brightness and the color difference may be used, or a difference value of a L* component in L*a*b* color space may be used.

As a result of judging in the step S702, in the case that the color corresponding to the RGB values of the pixel of interest is not the color close to the background color, the data processing unit 218 performs a processing of a step S704 that will be described later. As the result of the judging in the step S702, in the case that the color corresponding to the RGB values of the pixel of interest is the color close to the background color, the data processing unit 218 converts the RGB values of the pixel of interest into the RGB values of the background color (a step S703). In this way, in the present embodiment, the color corresponding to the RGB values that the color difference from the background color in the filter-applied image 601 is less than the color difference between the paper background portion of the paper document and the correction mark, is converted into the background color. Next, the data processing unit 218 judges whether or not all the pixels constituting the filter-applied image 601 have been selected (the step S704).

As a result of judging in the step S704, in the case that any one of the pixels constituting the filter-applied image 601 is not selected, the color converting processing returns to the step S701. The data processing unit 218 selects one pixel from the pixels not selected in the filter-applied image 601 as the pixel of interest, and performs the processing of the step S702 and following.

As the result of the judging in the step S704, in the case that all the pixels constituting the filter-applied image 601 are selected, the color converting processing ends. As a result of the color converting processing, the background neighboring color conversion image 802 of FIG. 8C that the color close to the background color in the filter-applied image 601 is converted into the background color, is generated.

According to the above-described embodiment, in the case that the dark reading mode is set, the background neighboring color conversion image 802 that is obtained by converting the color close to the background color in the filter-applied image 601 into the background color, is generated as the electronic document. As a result, it is possible to unify the color of the background region that occupies most of the region in the electronic document generated in the dark reading mode to the background color, and thus it is possible to improve the compression efficiency of the electronic document generated in the dark reading mode.

Further, in the above-described embodiment, the background color is determined based on the filter-applied image 601 that is obtained by performing the filter processing by means of the smoothing filter with respect to the scanned image generated by the scanner unit 201. As a result, it is possible to easily perform the determination of the background color by using the filter-applied image 601, in which the variations in the RGB values of the plurality of pixels constituting the scanned image are suppressed.

Furthermore, in the above-described embodiment, a histogram is generated based on the filter-applied image 601, and a color that has the highest appearance frequency in the said histogram is determined as the background color. As a result, it is possible to easily determine the background color even in the case that the color of the background region is not uniformized in the filter-applied image 601.

In the above-described embodiment, in the case that the dark reading mode is set, a color in the filter-applied image 601 that a color difference from the background color is equal to or less than the predetermined value, is converted into the background color. The predetermined value is the value less than the color difference between the paper background portion of the paper document and the correction mark. As a result, it is possible to convert the color corresponding to the RGB values that the color difference from the background color is less than the color difference between the paper background portion of the paper document and the correction mark into the background color. Thus, it is possible to generate an electronic document that the gradation difference between the paper background portion and the correction marks is maintained while improving the compression efficiency.

Although the present invention has been described above with reference to the above-described embodiment, the present invention is not limited to the above-described embodiment. For example, in the case that a correction mark region of the document in the scanned image is detected and the dark reading mode is set, a conversion image that is obtained by converting a color close to a background color in a region other than the correction mark region in the filter-applied image 601 into the background color, may be generated.

Figure 9A:
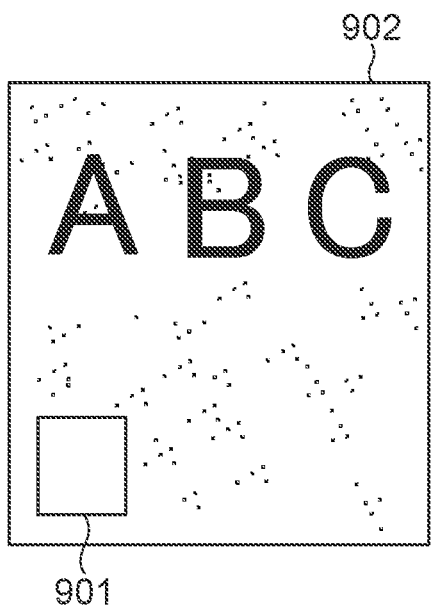
FIGS. 9A, 9B and 9C are figures for explaining the generation of a background neighboring color conversion image of a document including correction marks by a data processing unit of FIG. 5.
Figure 9B:
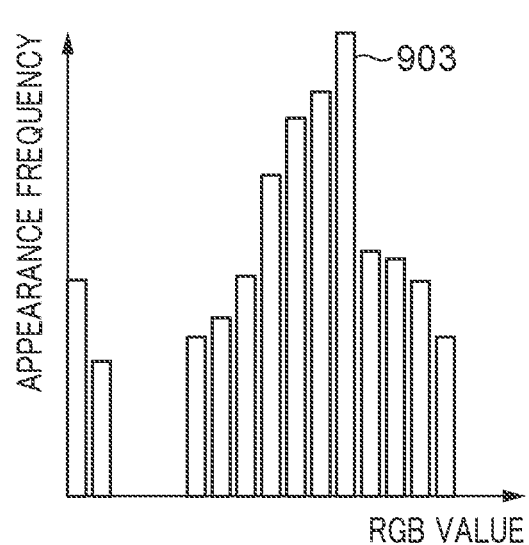
Figure 9C:
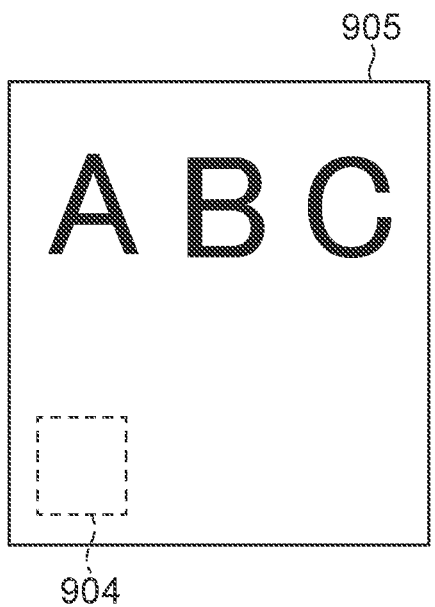

In the above-described embodiment, in the case of reading a document including correction marks caused by a correction fluid in the dark reading mode, a filter-applied image 902 including a correction mark region 901 shown in FIG. 9A is generated, and a histogram shown in FIG. 9B is calculated. Based on the histogram of FIG. 9B, a color corresponding to a total value 903 of the RGB values that has the highest appearance frequency is determined as the background color, and in the filter-applied image 902, a color close to the above background color is converted into the background color. Here, in the case that the color of the paper background portion of the document is the same color as the color of the correction mark, for example, white, there is a concern that the color of at least a part of the correction mark region is converted into the background color, and an electronic document of FIG. 9C, in which a contrast between the paper background portion of the document and the correction mark is not clear, is generated.

In contrast, in an embodiment described below, in the case that the correction mark region of the document in the scanned image is detected and the dark reading mode is set, the conversion image that is obtained by converting the color close to the background color in the region other than the correction mark region in the filter-applied image into the background color, is generated.

Figure 10:
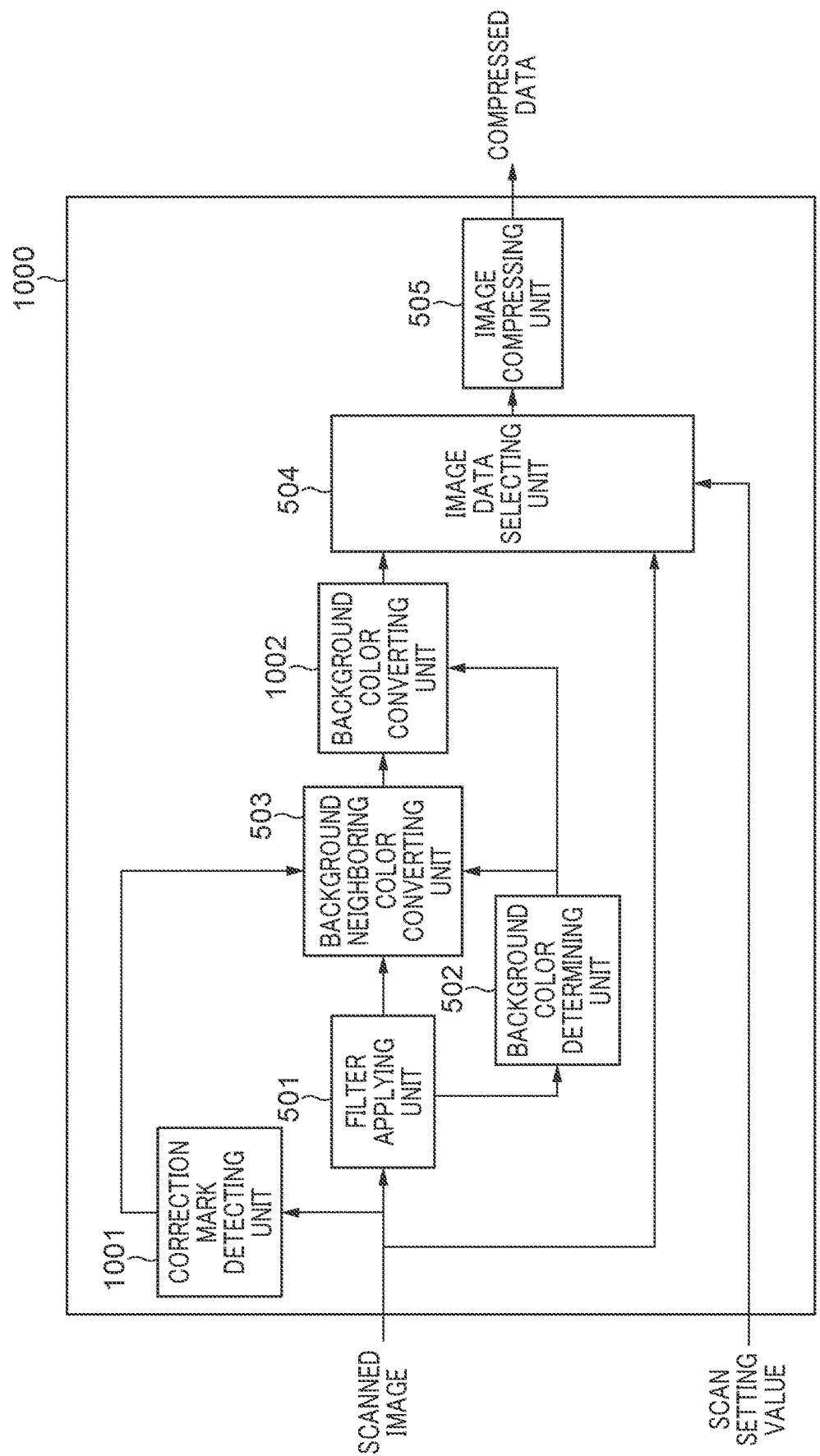
FIG. 10 is a block diagram that schematically shows another configuration of the data processing unit of FIG. 2.

FIG. 10 is a block diagram that schematically shows another configuration of the data processing unit 218 of FIG. 2. As shown in FIG. 10, in addition to constituent elements shown in FIG. 5, a data processing unit 1000, which is another configuration of the data processing unit 218 and functions as the conversion image generating unit, has a correction mark detecting unit 1001 that functions as a detecting unit and a background color converting unit 1002.

Figure 11:
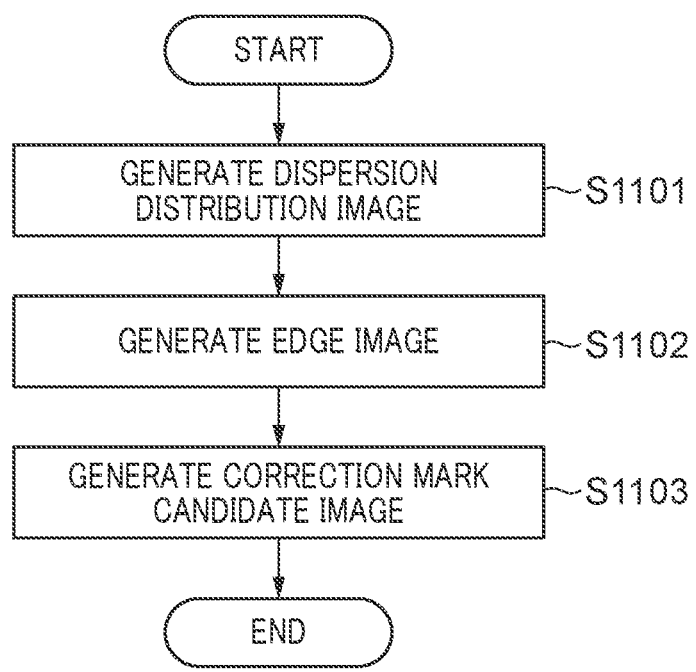
FIG. 11 is a flowchart that shows procedures of a correction mark detection processing performed by a correction mark detecting unit of FIG. 10.

The correction mark detecting unit 1001 executes a correction mark detection processing of FIG. 11 to detect the correction mark region in the scanned image obtained from the scanner unit 201.

Figure 12A:
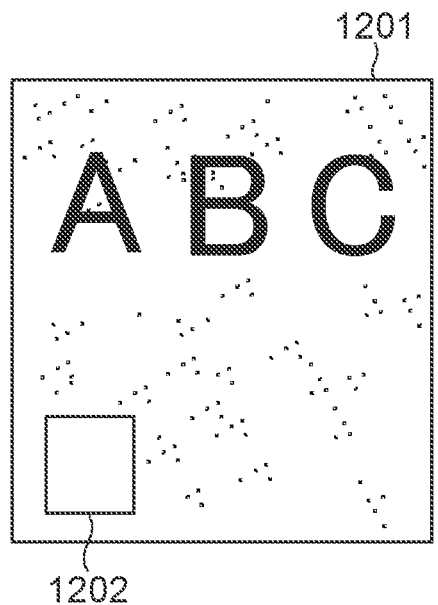
FIGS. 12A, 12B, 12C and 12D are figures for explaining details of the correction mark detection processing of FIG. 11.

FIG. 11 is a flowchart that shows procedures of the correction mark detection processing performed by the correction mark detecting unit 1001 of FIG. 10. Further, in the processing of FIG. 11, it is assumed that a scanned image 1201 of FIG. 12A has been obtained from the scanner unit 201. The scanned image 1201 includes a correction mark 1202.

Figure 12B:
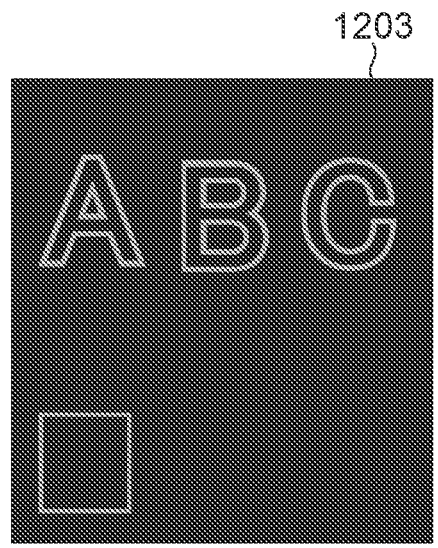

As shown in FIG. 11, the correction mark detecting unit 1001 generates a dispersion distribution image 1203 of FIG. 12B based on the scanned image 1201 obtained from the scanner unit 201 (a step S1101). The dispersion distribution image is an image that expresses the distribution of dispersion values of respective pixels calculated from luminance values of a pixel and respective pixels in a range of M×N centered on the pixel. In the present embodiment, as an example of the luminance value, although a value obtained by adding the values of the R component, the G component, and the B component at a ratio of (R:G:B=6:3:1) is used, the luminance value is not limited to this value. Further, in the present embodiment, although the range of M×N is described as a range of 5 pixels×5 pixels, the range of M×N is not limited to the range of 5 pixels×5 pixels, and the number of pixels (range) to be obtained may be changed according to the size of the image or the like. Furthermore, the dispersion value is calculated by using the following expression (1).

Expression (1)

$$\sigma L[n] = \sqrt{\sum_{i=1}^{N}(xLi-\mu L)^2/N} \quad (1)$$

$\sigma L[n]$ represents the luminance value of the n-th pixel in the scanned image. $xLi$ represents the luminance value of the i-th pixel within 5 pixels×5 pixels. $\mu L$ represents the average value of the luminance values of 5 pixels×5 pixels. N represents the total number of pixels (25). Further, $\Sigma$ represents the calculation of the sum. In the step S1101, the correction mark detecting unit 1001 performs calculations for all pixels and generates the dispersion distribution image 1203.

Figure 12C:
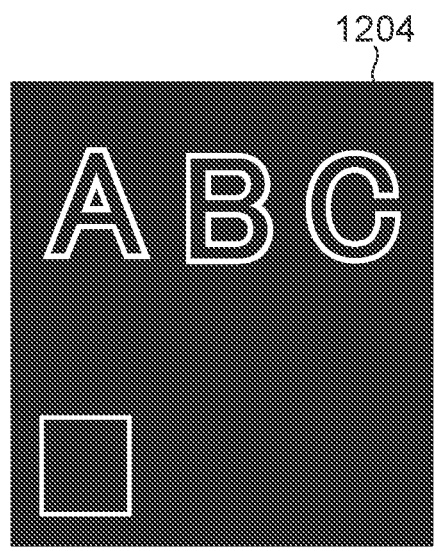

Next, the correction mark detecting unit 1001 generates an edge image 1204 of FIG. 12C based on the dispersion distribution image 1203 (a step S1102). In the step S1102, for example, the correction mark detecting unit 1001 performs edge extraction by using Canny method or the like to generate the edge image 1204, which is a binary image and in which an edge pixel is "1" and a non-edge pixel is "0". For example, since in reading by the scanner unit 201, an edge is generated at the boundary between the correction mark and the background of the document, the edge of the correction mark is judged as the edge pixel.

Next, the correction mark detecting unit 1001 detects the correction mark region in the scanned image by using the dispersion distribution image 1203 and the edge image 1204. Specifically, the correction mark detecting unit 1001 first extracts an edge having an enclosing shape. The correction mark detecting unit 1001 selects one edge pixel from a plurality of edge pixels having a pixel value of "1" in the edge image 1204, and then judges whether or not the edge pixel exists in eight pixels around the selected edge pixel. In the case that the edge pixel exists in the eight pixels around the selected edge pixel, the correction mark detecting unit 1001 selects one edge pixel from the eight pixels around the selected edge pixel, and then judges whether or not the edge pixel exists in eight pixels around the selected edge pixel. The correction mark detecting unit 1001 repeatedly executes this processing, and in the case that the pixel adjacent to the finally selected edge pixel is a pixel already judged to be an edge pixel, the correction mark detecting unit 1001 judges that an edge pixel group, which has an enclosing shape and includes the selected edge pixels, exists. On the other hand, in the case that the edge pixel does not exist in the eight pixels around the selected edge pixel, the correction mark detecting unit 1001 judges that the edge pixel group, which has the enclosing shape and includes the selected edge pixels, does not exist. After extracting the edges having the enclosing shape in this way, the correction mark detecting unit 1001 judges that with respect to pixels inside the edge pixel group having the enclosing shape, a pixel having the dispersion value equal to or less than a predetermined value is a correction mark candidate pixel.

Figure 12D:
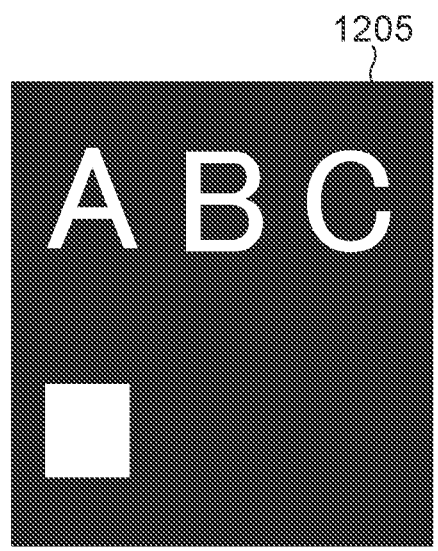

Next, the correction mark detecting unit 1001 generates a correction mark candidate image 1205 of FIG. 12D, in which the pixel values of the pixels judged to be the correction mark candidate pixel are set to "1" and the pixel values of the pixels other than the pixels judged to be the correction mark candidate pixel are set to "0" (a step S1103). Next, the correction mark detecting unit 1001 outputs the correction mark candidate image 1205 to the background neighboring color converting unit 503, and the correction mark detection processing ends.

Figure 13:
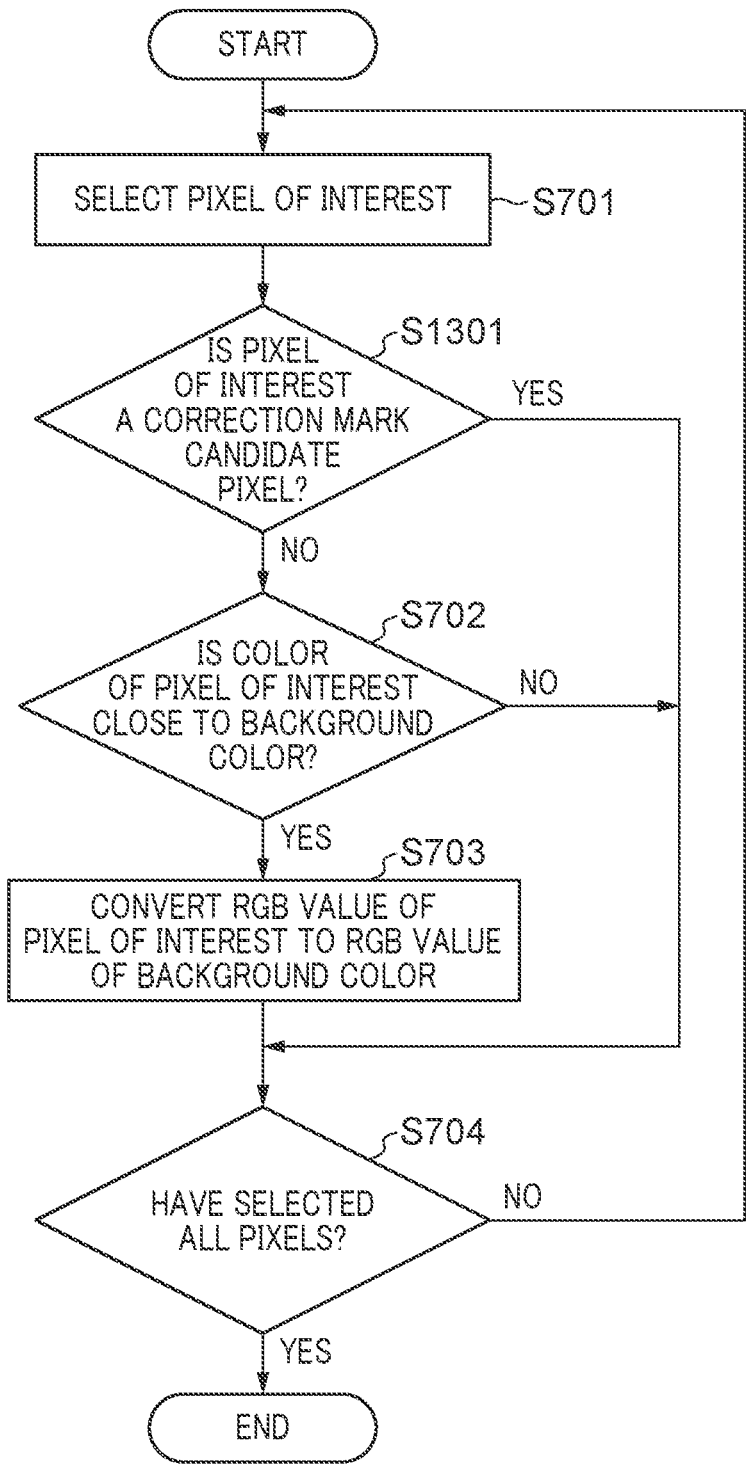
FIG. 13 is a flowchart that shows procedures of a color converting processing performed by a data processing unit of FIG. 10.

FIG. 13 is a flowchart that shows procedures of a color converting processing performed by the data processing unit 1000 of FIG. 10.

As shown in FIG. 13, the data processing unit 1000 performs the processing of the step S701 described above. Next, the data processing unit 1000 judges whether or not the pixel of interest is a correction mark candidate pixel based on the correction mark candidate image 1205 generated by the correction mark detecting unit 1001 (a step S1301). In the step S1301, in the case that the pixel value of the pixel of interest in the correction mark candidate image 1205 is "1", the data processing unit 1000 judges that the pixel of interest is the correction mark candidate pixel. On the other hand, in the case that the pixel value of the pixel of interest in the correction mark candidate image 1205 is "0", the data processing unit 1000 judges that the pixel of interest is not the correction mark candidate pixel.

As a result of judging in the step S1301, in the case that the pixel of interest is not the correction mark candidate pixel, the color converting processing proceeds to the step S702. In this way, in the present embodiment, the color close to the background color in the region other than the correction mark region in the filter-applied image is converted into the background color. As the result of the judging in the step S1301, in the case that the pixel of interest is the correction mark candidate pixel, the color converting processing proceeds to the step S704, in the case that all the pixels constituting the filter-applied image 601 are selected, the color converting processing ends. As a result of the color converting processing of FIG. 13, a background neighboring color conversion image that the RGB values of the pixels having a color close to the background color but not the correction mark candidate pixels are converted into the RGB values of the background color, is generated.

Figure 14:
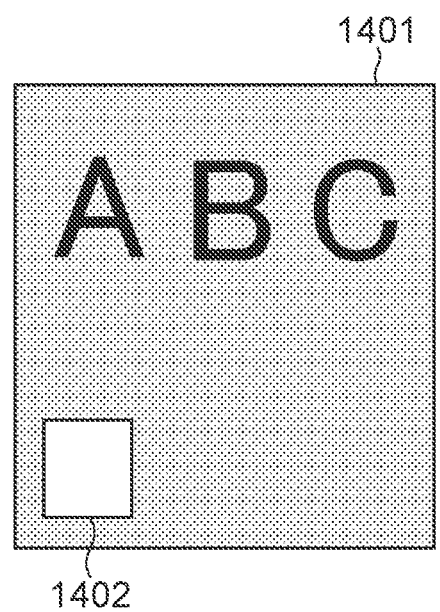
FIG. 14 is a figure that shows an example of the background neighboring color conversion image generated by the color converting processing of FIG. 13.

Returning to FIG. 10, the background color converting unit 1002 decreases the brightness of the background color in this background neighboring color conversion image by a predetermined amount. Specifically, in above background neighboring color conversion image, the background color converting unit 1002 subtracts a first value, for example, 10 from the RGB values of the R component, the G component, and the B component of all pixels having the same RGB values as the RGB values included in the background color information generated by the background color determining unit 502. Moreover, the first value is not limited to 10, and may be, for example, a value obtained by rounding down the decimal point from a value obtained by reducing the average value of the RGB values of the background color information to ¹⁄₁₀. The RGB values of the correction mark are basically higher than that of the background color. Therefore, as described above, by subtracting the first value from the RGB values of all the pixels having the same RGB values as the RGB values included in the background color information, the color difference between the background and the correction marks becomes clearer, and an electronic document 1401 shown in FIG. 14, in which a correction mark region 1402 is easily visible, is generated.

In the above-described embodiment, in the case that the correction mark region of the document in the scanned image is detected and the dark reading mode is set, the conversion image that is obtained by converting the color close to the background color in the region other than the correction mark region in the filter-applied image into the background color, is generated. Therefore, it is possible to prevent the color of at least a part of the correction mark region in the filter-applied image from being converted into the background color to generate an electronic document, in which the contrast between the paper background portion of the document and the correction mark is not clear.

Further, in the above-described embodiment, the electronic document 1401, in which the brightness of the background color in the background neighboring color conversion image is decreased by the predetermined amount, is generated. As a result, it is possible to generate an electronic document, in which the correction marks are easily visible.

In the above-described embodiment, the brightness of the color of the correction mark region in the background neighboring color conversion image may be increased by a predetermined amount.

Figure 15:
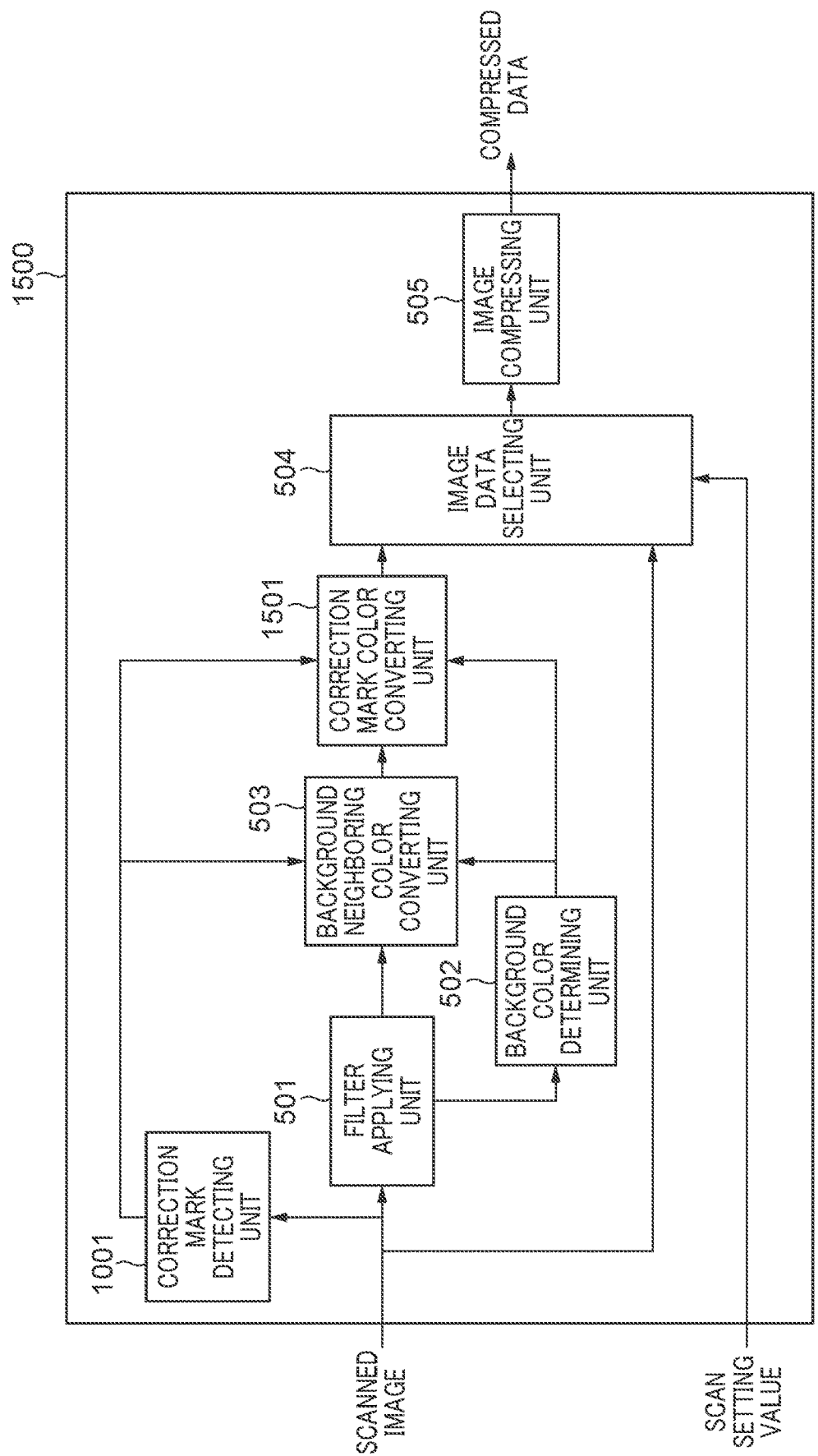
FIG. 15 is a block diagram that schematically shows another configuration of the data processing unit of FIG. 2.

FIG. 15 is a block diagram that schematically shows another configuration of the data processing unit 218 of FIG. 2. As shown in FIG. 15, in addition to constituent elements shown in FIG. 5, a data processing unit 1500, which is another configuration of the data processing unit 218 and functions as the conversion image generating unit, has the correction mark detecting unit 1001 and a correction mark color converting unit 1501. The correction mark color converting unit 1501 increases the brightness of the color of the correction mark region in the background neighboring color conversion image by the predetermined amount. Specifically, the correction mark color converting unit 1501 adds a second value, for example, 10 to the RGB values of the correction mark candidate pixel. Moreover, the second value is not limited to 10, and may be other values.

Figure 16:
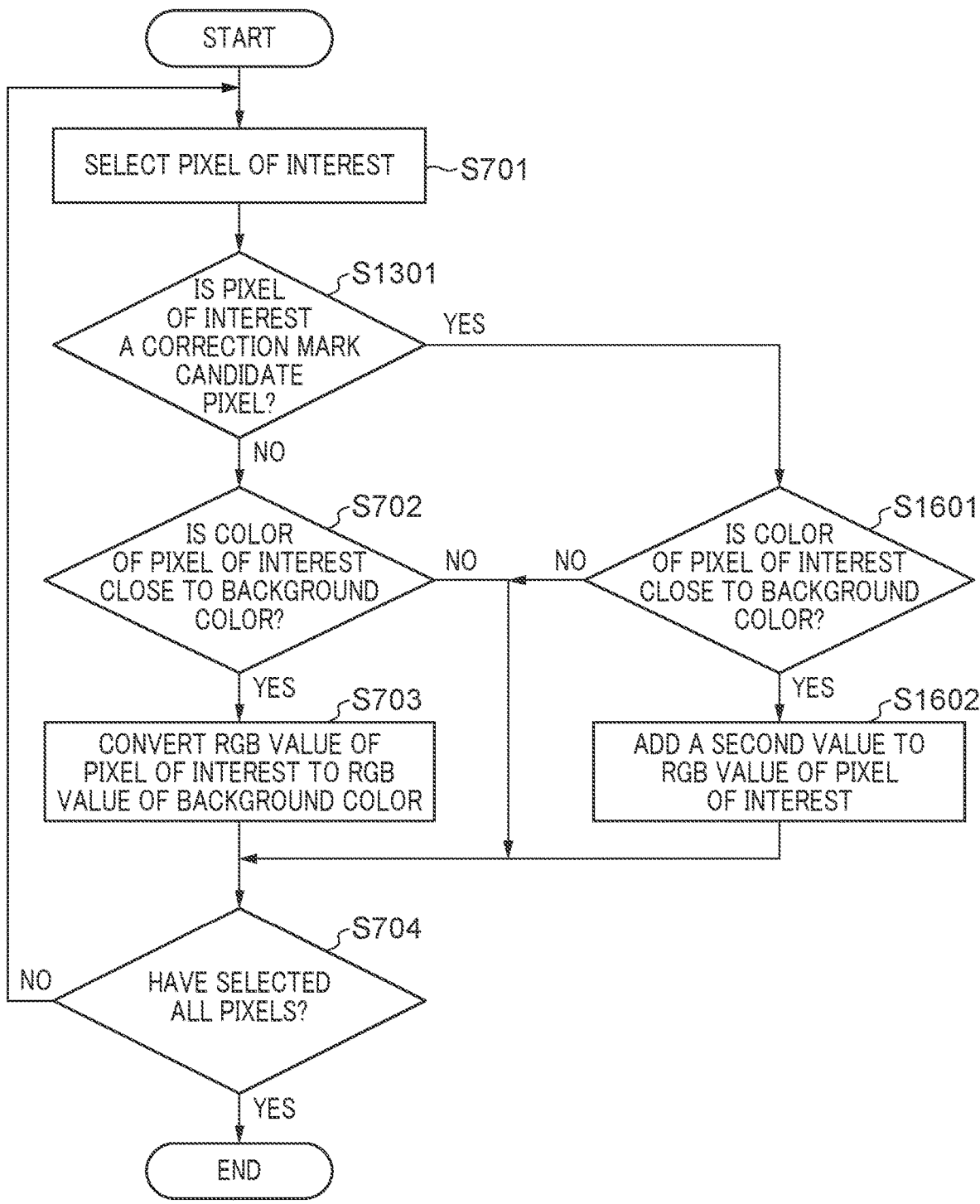
FIG. 16 is a flowchart that shows procedures of a color converting processing performed by a data processing unit of FIG. 15.

FIG. 16 is a flowchart that shows procedures of a color converting processing performed by the data processing unit 1500 of FIG. 15.

As shown in FIG. 16, the data processing unit 1500 performs the processing of the step S701 described above and the processing of the step S1301 described above.

As the result of the judging in the step S1301, in the case that the pixel of interest is not the correction mark candidate pixel, the color converting processing proceeds to the step S702. As the result of the judging in the step S1301, in the case that the pixel of interest is the correction mark candidate pixel, the data processing unit 1500 performs a processing of a step S1601. In the step S1601, as with the step S702, the data processing unit 1500 judges whether or not the color corresponding to the RGB values of the pixel of interest is the color close to the background color determined by the background color determining unit 502.

As a result of judging in the step S1601, in the case that the color corresponding to the RGB values of the pixel of interest is not the color close to the background color determined by the background color determining unit 502, the color converting processing proceeds to the step S704. As the result of the judging in the step S1601, in the case that the color corresponding to the RGB values of the pixel of interest is the color close to the background color determined by the background color determining unit 502, the data processing unit 1500 adds the second value, for example, 10 to the RGB values of the pixel of interest (a step S1602). After that, the color converting processing proceeds to the step S704.

In the above-described embodiment, the data processing unit 1500 increases the brightness of the color of the correction mark region in the background neighboring color conversion image by the predetermined amount. As a result, it is possible to generate an electronic document, in which the contrast between the paper background portion of the document and the correction mark is clear.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-169184, filed Oct. 6, 2020, which is hereby incorporated by reference herein in its entirety.

What is claimed is:

1. An image processing apparatus comprising:
a reading unit configured to read a document and generate image data;
a reading mode setting unit configured to set a reading mode of the reading unit to a first reading mode or a second reading mode, in which the document is read with the amount of light less than that in the first reading mode;
a background color determining unit configured to determine a background color in the image data generated by the reading unit; and
a conversion image generating unit configured to generate image data, in which a color close to the background color in the image data is converted into the background color, in a case that the second reading mode is set.

2. The image processing apparatus according to claim 1, further comprising:
an image processing unit configured to generate image-processed image data that is obtained by performing a filter processing by means of a smoothing filter with respect to the image data generated by the reading unit.

3. The image processing apparatus according to claim 2, wherein the background color determining unit generates a histogram based on the image-processed image data, and determines a color having the highest appearance frequency in the histogram as the background color.

4. The image processing apparatus according to claim 1, wherein the conversion image generating unit converts a color in the image data, in which a color difference from the background color is equal to or less than a predetermined value, into the background color in a case that the second reading mode is set.

5. The image processing apparatus according to claim 4, wherein the predetermined value is a value less than a color difference between a paper background portion of the document and a correction mark.

6. The image processing apparatus according to claim 1, further comprising:
a detecting unit configured to detect a correction mark region of the document in the image data generated by the reading unit, and
wherein the conversion image generating unit generates a conversion image, in which a color close to the background color in a region in the image data that is different from the detected correction mark region is converted into the background color, in a case that the second reading mode is set.

7. The image processing apparatus according to claim 6, wherein the detecting unit detects the correction mark region based on dispersion values of the image data generated by the reading unit, and an edge image generated by edge extraction of the image data.

8. The image processing apparatus according to claim 6, wherein the conversion image generating unit decreases a brightness of the background color by a predetermined amount in generating of the conversion image.

9. The image processing apparatus according to claim 6, wherein the conversion image generating unit increases a brightness of the detected correction mark region by a predetermined amount in generating of the conversion image.

10. A control method for an image processing apparatus that comprises a reading unit configured to read a document and generate image data, the control method comprising:

a step of setting a reading mode of the reading unit to a first reading mode or a second reading mode, in which the document is read with the amount of light less than that in the first reading mode;

a step of determining a background color in the image data generated by the reading unit; and a step of generating image data, in which a color close to the background color in the image data is converted into the background color, in a case that the second reading mode is set.

11. A non-transitory computer-readable storage medium storing a program for causing a computer to execute a control method for an image processing apparatus that comprises a reading unit configured to read a document and generate image data, the control method comprising:

a step of setting a reading mode of the reading unit to a first reading mode or a second reading mode, in which the document is read with the amount of light less than that in the first reading mode;

a step of determining a background color in the image data generated by the reading unit; and a step of generating image data, in which a color close to the background color in the image data is converted into the background color, in a case that the second reading mode is set.

* * * * *